United States Patent

[11] 3,573,342

| [72] | Inventors | Howard W. Graybill;<br>Roy H. Albright, Greensburg, Pa. |
|---|---|---|
| [21] | Appl. No. | 812,016 |
| [22] | Filed | Apr. 1, 1969 |
| [45] | Patented | Apr. 6, 1971 |
| [73] | Assignee | I-T-E Imperial Corporation<br>Philadelphia, Pa. |

[54] COMPRESSED-GAS-INSULATED HIGH VOLTAGE ELECTRICAL CONDUCTOR UTILIZING PREASSEMBLED LENGTHS JOINED BY FIELD-WELDED EXPANSION JOINTS
18 Claims, 5 Drawing Figs.

[52] U.S. Cl.................................................. 174/22,
174/13, 174/28, 174/99
[51] Int. Cl.................................................. H01b 9/06,
H02g 15/24
[50] Field of Search........................................... 174/10, 11,
12, 13, 21, 21.3, 21.4, 22, 22.2, 27, 28, 29, 88 (B),
99, 99 (B), 99 (E)

[56] References Cited
UNITED STATES PATENTS
3,348,001  10/1967  Upton, Jr. et al. ............  174/28UX
FOREIGN PATENTS
879,563  6/1953  Germany........................  174/22(.2)

*Primary Examiner*—Laramie E. Askin
*Attorney*—Ostrolenk, Faber, Gerb & Soffen

ABSTRACT: A metal-enclosed high-voltage rating electrical conductor assembly of unitary design. Similar sections of such assemblies are positioned end-to-end to form a bus run and are jointed together by yieldable duct cover assemblies and conductive connectors. Insulating spacers arranged at spaced intervals along each section are permanently secured within each section and arranged to prevent any egress of compressed gas confined to a section either during shipment upon installation or thereafter. The joining of adjacent sections may therefore be carried out without any concern being given to disturbing the compressed gas contained within each section or without any concern being given to the rigid mounting of the spacer elements.

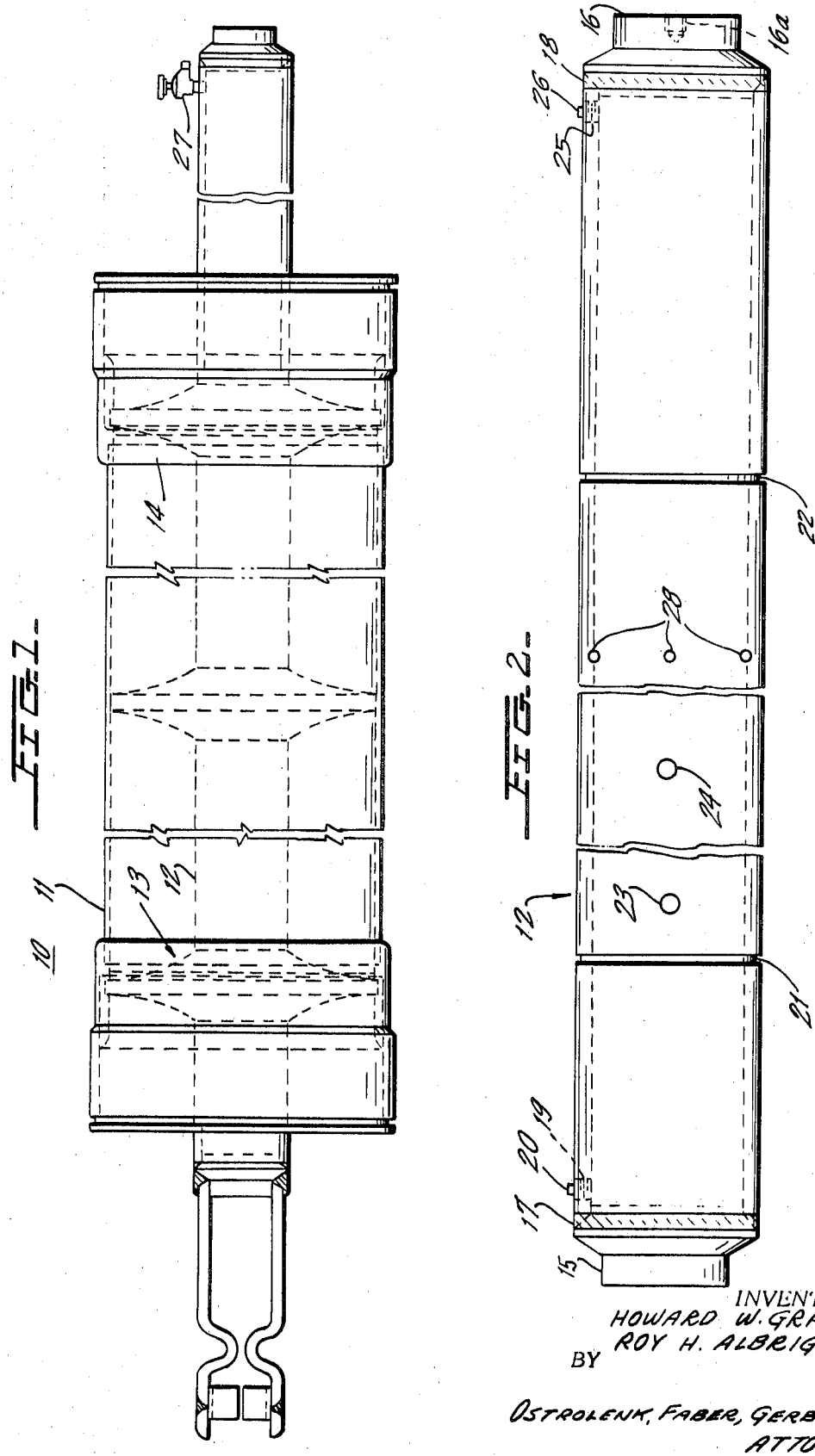

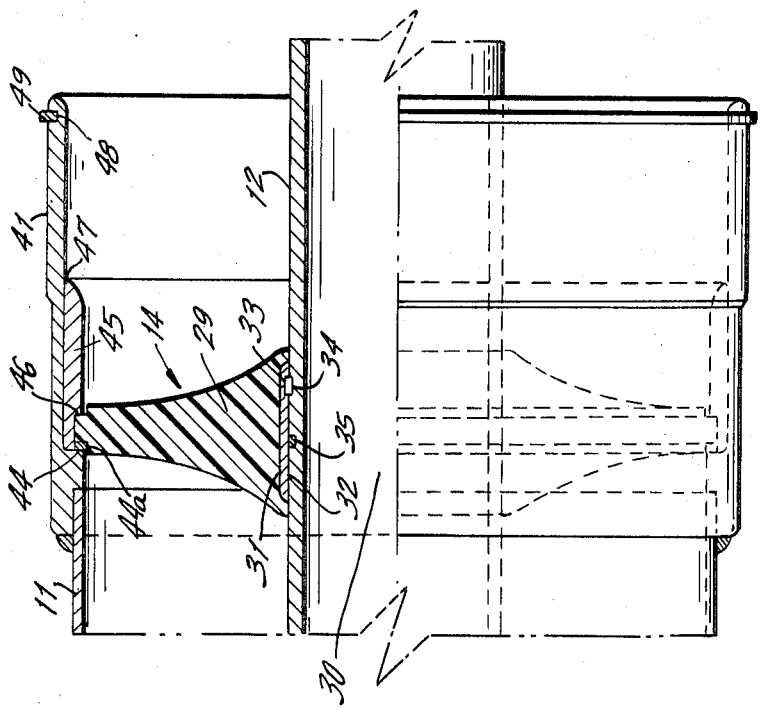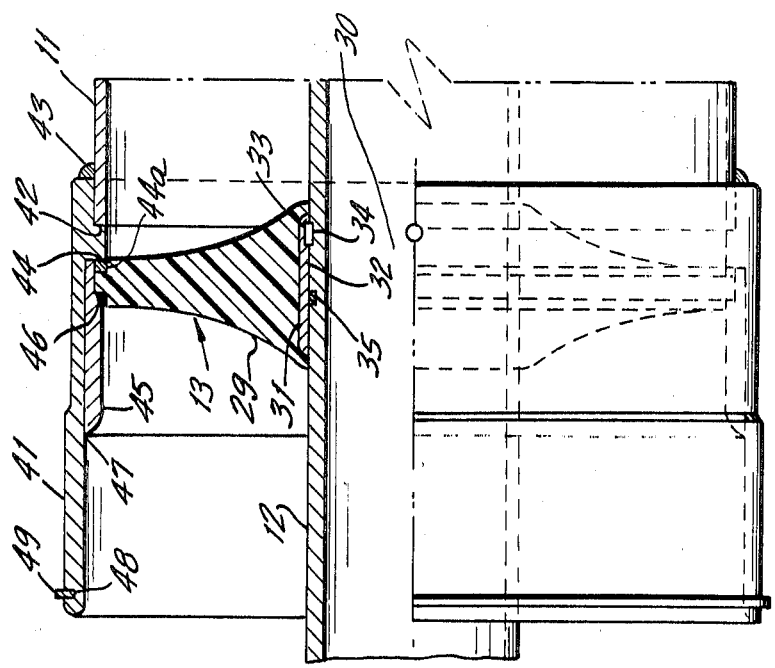

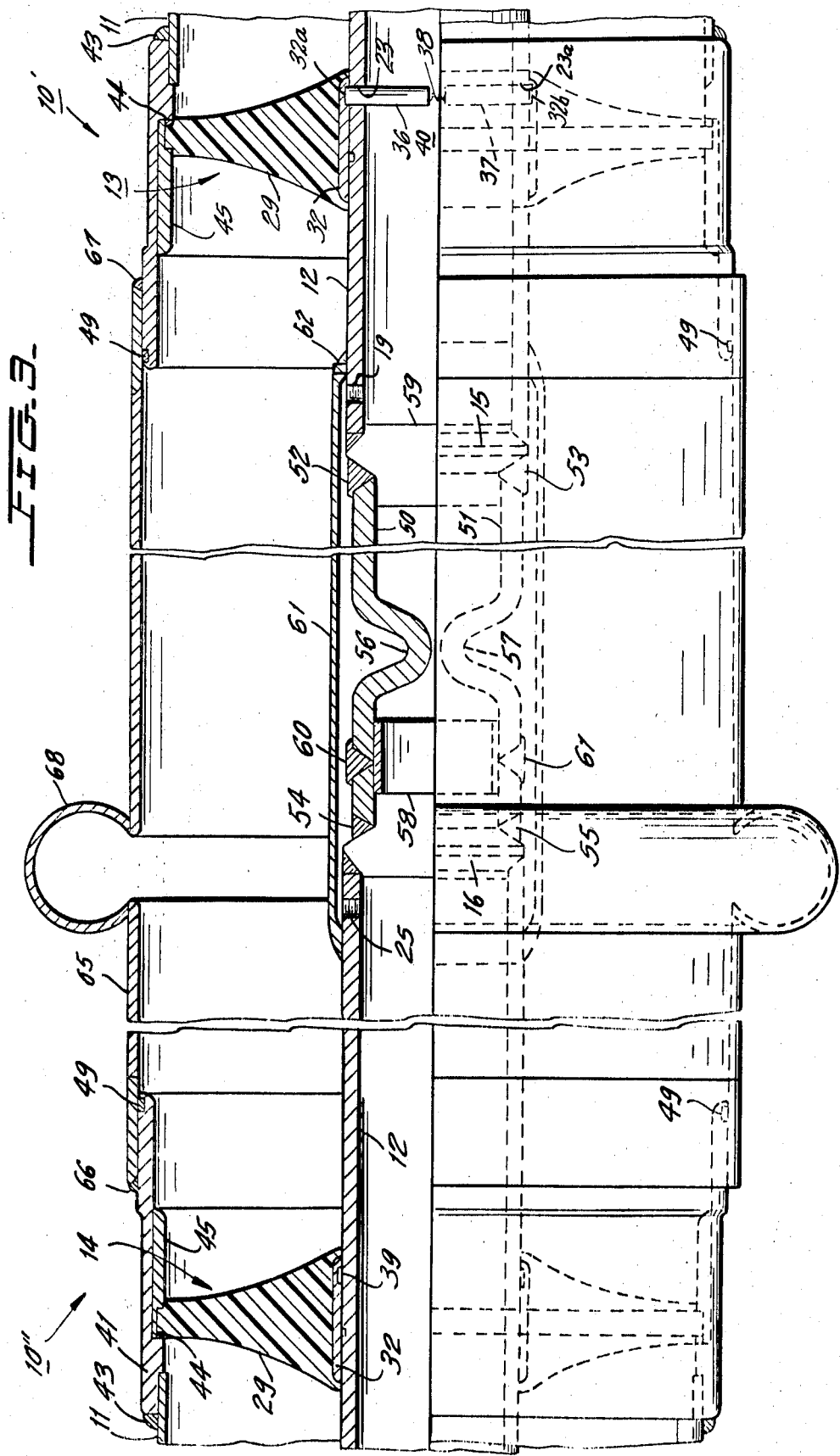

COMPRESSED-GAS-INSULATED HIGH VOLTAGE ELECTRICAL CONDUCTOR UTILIZING PREASSEMBLED LENGTHS JOINED BY FIELD-WELDED EXPANSION JOINTS

The present invention relates to high-voltage transmission lines for power transmission and more particularly to conductor assemblies of the compressed-gas-insulated type comprised of novel preassembled sections which simplify the installation cost and complexities in the field due to their preassembled construction.

Metal-enclosed high-voltage electrical conductors are usually comprised of a metallic conductor having a generally tubular configuration and being coaxially aligned with a grounded metallic tube of larger diameter surrounding the conductor. The positioning and support of the conductor within the enclosure is provided by means of solid disc or cone insulators arranged at spaced intervals within each enclosure. The hollow interior region defined by the inner conductor and outer enclosure is filled with a compressed gas such as sulfurhexafluoride (SF-6) which has excellent properties to insulate the inner conductor from the outer enclosure. Such electrical conductors can be used to great advantage as buses in electrical substations or generating stations, or for transmission of electrical power over either short, intermediate or long distances. Such assemblies may be buried underground or supported at some convenient height above ground. The principal advantage of compressed-gas-insulated buses as compared with conventional open buses (i.e., conductors not surrounded by metallic enclosures) is the tremendous reduction in space requirements. Whereas extra high voltage (EHV) buses of open construction in air may require ground clearances of 8—15 feet and phase spacings of 15—20 feet, the metal-enclosed, compressed-gas-insulated buses may utilize ground clearances of as little as 4—10 inches and phase spacings of as little as 24—42 inches in equivalent applications formerly employing equipment not utilizing compressed-gas-insulation and conductive enclosures. In addition thereto, the compressed-gas-insulated bus having a grounded metal enclosure for each phase, offers better reliability and greater safety as compared with conventional open EHV conductors.

A considerable amount of research has been conducted on compressed-gas-insulated conductors, some of the principal work being performed in Europe and the Orient and some operating substations using conductors of this type are presently in existence. All such systems presently in use employ bolted and gasketed joints along the enclosure tubing. Flanges are preferably welded to the ends of individual enclosure sections and the sections are then bolted together by means of a multiplicity of bolts disposed around the flanges with the axis of the bolts being arranged substantially parallel to the longitudinal axes of the conductor. These joints are located at each support insulator which holds the conductor concentric with the enclosure tubing. Gaskets are utilized between the flanges to prevent the gas from leaking out into the atmosphere.

Unfortunately, experience has shown that gaskets, whether of cork or various types of natural or synthetic rubber, are all subject to deterioration and tend to leak after some period of time. This tendency is rapidly accelerated by temperature cycling of the bus system which occurs regularly during normal operation. Even in the best case, if gas leakage is detected and the gas (i.e., SF–6) is replaced before significant drop in pressure occurs, the cost of gas replacement is both expensive and tedious. If the pressure drop of the compressed-gas is too large, before satisfactory detection occurs, a power flashover may occur due to the decrease in dielectric strength of the gas as a result of the reduced pressure.

The present invention is characterized by providing a novel bus assembly wherein sections are preassembled at the factory and shipped in this condition to the job site to thereby greatly reduce the amount of installation activities required and further to eliminate the need for gaskets and flanges employed in conventional structures at those locations along the bus run where adjacent sections are joined.

The present invention is comprised of a unitary bus structure fully preassembled at the factory. Each assembly includes a central conductor and a coaxially aligned conductive enclosure surrounding the conductor. Coaxial alignment is maintained by the use of insulating spacers arranged in spaced intervals within the enclosure. The insulating spacers are provided at locations near the ends of the enclosure and further means are provided for rigidly locking the spacers in position and for sealing the regions between the spacer and the enclosure and between the spacer and the conductor so as to prevent the escape of any compressed-gas contained within the hollow interior of each preassembled section.

Each of the preassembled sections are then shipped to a job site for field installation. In the simplest and most straightforward case, sections are arranged coaxially in end-to-end fashion. The facing ends of adjacent sections are joined together by cover assemblies which are telescoped over end portions of the adjacent sections and then preferably welded or otherwise joined thereto. This arrangement totally eliminates the need for disturbing each of the insulating spacers during the joiner of end-to-end bus sections thereby greatly simplifying the installation activities. The preassembly of the individual bus sections allows rather exhaustive and thorough testing to be performed on each section prior to shipment, thereby reducing the number of functions which must be performed at a job site. The design of the cover sections is such as to prevent the entrance of contaminants into the bus run during the final assembly steps at the job site.

It is therefore one object of the present invention to provide a novel compressed-gas-insulated electrical conductor structure which is preassembled to the maximum degree within the factory to greatly reduce the complexities of job site installation and thereby result in an overall reduction in the number of activities required between fabrication and final assembly.

Another object of the present invention is to provide metal-enclosed high-voltage electrical conductor assemblies which include coaxially aligned inner and outer conductive members in which locking and joining assemblies are provided for securing insulating spacers within each preassembled section and effectively sealing each section to prevent the leakage of any compressed gas contained within each section and further eliminate the need for providing flanges and gaskets at the ends of sections to be joined to thereby reduce installation activities at the job site and simplify the configuration of joining sections.

These as well as other objects of the present invention will become apparent when reading the accompanying description and drawings in which:

FIG. 1 shows a side view of a bus section designed in accordance with the principles of the present invention.

FIGS. 1a and 1b are detailed views of the left-hand and right-hand end portions of the bus assembly of FIG. 1 which views are partially sectionalized.

FIG. 2 is a side view showing the conductor tube of the assembly of FIG. 1 in greater detail.

FIG. 3 is a side view, partially sectionalized, showing the joining assembly employed for electrically and substantially hermetically joining adjacent sections of the type shown in FIG. 1.

FIG. 1 shows a completed preassembled bus section 10 which is comprised of a conductive enclosure 11. The tubular-shaped enclosure 11 houses a plurality of spacers two of which, namely, spacers 13 and 14, are shown in dotted fashion in FIG. 1. The spacers which will be described in more detail hereinbelow act as the means for maintaining the enclosure 11 and conductor 12 in substantially coaxial alignment.

FIG. 2 shows a detailed view of the conductor which is a hollow tubular member provided with plugs 15 and 16 joined to the tubular member by sealing welds 17 and 18, respectively and plug 16 is provided with a tapped opening 16a for receiving a fastening member. Another tapped opening 19 is provided near the left-hand end and is likewise sealed by a threaded member 20. Conductor 12 is provided with a pair of continuous grooves 21 and 22 for receiving sealing gaskets in a manner to be more fully described. Spacers are locked to the conductor by means of a plunger assembly which will be more fully described and is comprised of pins biased apart to pass through diametrically opposed openings. Only one of these openings, namely, opening 23 is shown in FIG. 2, it being understood that the cooperating opening lies on the same diameter of conductor 12 as opening 23. In a similar fashion, a spacer may be located intermediate the ends of the section 10 of FIG. 1 and a similar pair of openings are provided for this spacer. Only one of these openings, namely, opening 24 is shown in FIG. 2, it being understood that the cooperating opening lies diametrically opposite the opening 24. The right-hand end of conductor 12 is provided with another tapped aperture 25 for alternatively receiving either a threaded member 26 (see FIG. 2) or a diaphragm valve assembly 27 (see FIG. 1) which may be utilized in a manner to be more fully described for determining the compressed-gas pressure level within the bus assembly. A plurality of small openings 28 are arranged at spaced intervals around the circumference of the conductor 12 to allow for the entrance of the compressed-gas (SF–6) into the hollow region between the opposing faces of conductor 12 and enclosure 11 in a manner to be more fully described.

FIGS. 1a and 1b show detailed views, partially sectionalized of the spacers 13 and 14 located at the left-hand and right-hand ends of the assembly. Like elements will be designated by like numerals and for purposes of simplicity only one of the spacer structures will be described in detail.

The spacer 13 located near the right-hand end of assembly 10, is comprised of a disc insulator 29 provided with a central opening 30 for receiving conductor 12. The periphery of the central opening is provided with a wide shallow groove 31 for receiving a metal sleeve 32. Sleeve 32 is provided with a shallow substantially rectangular-shaped groove 33 for receiving a flat rectangular-shaped leaf spring member 34 seated within groove 33 for maintaining sleeve 32 and conductor 12 in intimate electrical contact. The continuous groove 21 of FIG. 2 receives a gasket 35 which is compressed between sleeve 32 and groove 21 to seal the region between sleeve 32 and conductor 12 and thereby prevent the escape of any gas contained within the assembly 10 into the atmosphere. As can clearly be seen from FIG. 1a (and likewise from FIG. 1b) the disc insulator 29 is widest in the immediate region of the central opening and tapers to a narrower configuration toward its outer periphery. As shown in FIG. 3, the spacer assembly 13 is mechanically locked to conductor 12 by means of plunger assembly 40 which is comprised of a pair of pins 36 and 37 having openings near their facing ends for receiving a spring member 38. The outer ends of the pins 36 and 37 project through a pair of openings provided in conductor 12, designated by numerals 23 and 23a in FIG. 3. The helical spring member 38 urges the ends of the pins through openings 23 and 23a and into shallow circular-shaped cavity 32a and cavity 32b provided at spaced intervals along the interior surface of metal sleeve 32. Although not shown, for purposes of simplicity, the centrally located spacer which would be substantially aligned with the opening 24 in conductor 12 (see FIG. 2) is preferably locked to conductor 12 by a plunger assembly substantially identical to the assembly 40 shown in FIG. 3.

Returning to a consideration of FIG. 1a, the left-hand end of enclosure 11 is secured to metal sleeve 41 which telescopes over a portion of enclosure 11 so that its interior shoulder 42 abuts against the left-hand edge of enclosure 11. Sleeve 41 is welded to enclosure 11 at 43 which is a continuous seal weld.

A second shoulder 44 provided within the interior of metallic sleeve 41 provides a bearing surface for the right-hand periphery of disc insulator 29. A continuous gasket 44a is interposed between these components. An insulator and gasket retaining sleeve 45 is telescoped within metal sleeve 41 and is provided with a shoulder 46 which bears against the left-hand edge of the disc insulator periphery. Sleeve 45 is firmly pressed into position so as to compress gasket 44a. Sleeve 45 is welded to sleeve 41 while being maintained in this position, the seal weld being shown at 47. This arrangement prevents the escape of any compressed-gas between opposing surfaces of disc insulator 29 and sleeve 41. The outer end of sleeve 41 is provided with a continuous groove 48 for receiving a gasket 49 which functions in a manner to be more fully described in conjunction with a duct cover assembly (likewise to be more fully described in conjunction with the description of FIG. 3).

Once the structure 10 of FIG. 1 is fully assembled, the end insulators 13 and 14 act to seal the interior of the bus. The compressed-gas may be injected into the interior of the assembly through the diaphragm valve structure 27. The gas will enter into the interior of conductor 12 and pass into the hollow region between conductor 12 and enclosure 11 by means of the openings 28 arranged at spaced intervals around the circumference of conductor 12, as shown best in FIG. 2. When the appropriate pressure level is reached, the valve 27 may be closed thereby sealing the compressed-gas within the assembly.

FIG. 3 shows the assembly employed for joining bus sections of the type shown in FIG. 1, which sections are arranged in coaxial, end-to-end fashion. For such a field installation, bus assemblies are arranged in coaxial fashion and spaced (in the manner shown in FIG. 3) so that the left-hand end of one assembly 10' confronts the right-hand end of a second bus assembly 10''. Only portions of the assemblies 10' and 10'' have been shown in FIG. 3 for purposes of simplicity. A plurality of elongated conductive members join the left-hand end of conductor 12 provided in the assembly section 10', to the right-hand end of conductor 12 provided in the assembly section 10''. Only two of these conductive members 50 and 51 are shown in FIG. 3. Actually, there are eight such conductive members arranged at regularly spaced intervals. These conductive members are each joined to metallic sleeves 58 and 59 during a preassembly operation. This assembly is then joined by the welds, such as shown at 52 and 53, to the left-hand end of central conductor 12. This completed assembly is then shipped for field installation. The "preassembly" further includes sleeve 58, utilized to facilitate the factory fabrication wherein the conductive members are joined thereto by welds such as 60 and 61. The fields welds are shown at 54 and 55 which are utilized to join the conductive members to the right-hand end of inner conductor 12 in section 10''. The eight conductive members (only two of which are shown in FIG. 3) are each comprised of a plurality of thin laminations. In one preferred embodiment, each conductive member is comprised of approximately 40 laminations each of 20 mil thickness. Each of the conductive members such as 50 and 51, is provided with a bent or curved portion 56 and 57, respectively, which is yieldable in order to allow for normal expansion and contraction between the two conductors of sections 10' and 10''.

Since the curved portions, such as 56 and 57 of the conductive members would interfere with one another if located at the same position along the length of each member, diametrically opposed pairs of these conductive members have their curved portions offset relative to each of the remaining diametrically opposed pairs of conductive members. For example, one such pair (not shown) would have its curved portions lying to the left of curved portions 56 and 57, another such pair of conductors (not shown) would have their curved portions positioned to the right of curved portions 56 and 57, and so forth.

Sleeve 58 is joined to the bars by field welds 60 and 61 while sleeve 59 may be joined to bars 50 and 51 by means of the field welds 52 and 53, respectively.

After welding the conductive members 50 and 51 to the conductors of bus assemblies 10' and 10'' a hollow tubular shield 61, which is initially telescoped over the left-hand portion of conductor 12 provided in bus assembly 10'', is slid to the right until it is moved to the solid line position shown in FIG. 3. Prior to being slid to this position, the threaded fasteners provided in tapped openings 19 and 25 are removed. The corona shield 61 may then be maintained in position through the use of setscrews 62 which threadedly engage threaded openings provided near the right-hand end of corona shield 61 so as to bear against the outer surface of conductor 12 provided in bus section 10' and thereby retain the corona shield in position. The corona shield 61 completely surrounds all of the field welds and other joining components so as to present a relatively smooth surface confronting the interior surface of the sliding duct cover assembly 65 and thereby maintain high withstand and corona inception voltages.

Prior to the assemblies described above, the slidable duct cover assembly 65 is telescoped over the right-hand end of bus section 10" to provide sufficient working room for installing and welding the conductive bars 50 and 51. After the conductive bars 50 and 51 are placed in position, and welded, the slidable duct cover 65 is slid to the solid line position shown in FIG. 3 so that its extreme left-hand and right-hand ends telescope over the metal sleeves 41,41 provided at the confronting ends of bus sections 10' and 10". Continuous seal welds located at 66 and 67 join and seal the slidable duct cover to the enclosures of bus sections 10' and 10". Gaskets 49,49 act to prevent any contaminants which may be generated during the formation of seal welds 66 and 67 from entering into the interior region confined by duct cover 65. Since the seal welds 66 and 67 act to effectively hermetically seal the joined enclosure sections 10' and 10", their importance thereafter diminishes.

The intermediate section of duct cover 65 is provided with a hollow toroidal-shaped portion 68 which is yieldable to allow for differential expansion and contraction of the joined bus sections 10' and 10" without affecting the seal welds 66 and 67.

The removal of gas sealing plugs provided in threaded openings 19 and 25 allows for the relatively free passage of gas between adjoining bus sections. After the conductors 12,12 of the adjacent bus sections 10' and 10" are welded together and immediately before sliding and welding the telescoping duct cover 65 into place, the exposed surfaces of the insulators 29,29 are preferably cleaned to remove any contaminants which may have been generated during the welding operation.

Whereas the preferred embodiment of FIG. 3 has been described as utilizing welding operations to join connected components, it should be understood that these parts may also be joined by other means such as soldering or cementing, the final selection depending upon the needs of the particular user.

The preassembled bus sections preferably have lengths in a range between 10—50 feet, the final length determination being a compromise between handling and field installation and the problems encountered in transportation of such preassembled sections. The final installation is simplified by virtue of the fact that the insulating spacers are already fixedly secured and sealed within their respective bus sections reducing the final joining operations merely to those involving the sealing of the conductive bars to the bus section conductors and the duct cover to the bus section enclosures thereby eliminating the need for joining flanges, gaskets and fastening bolts employed in conventional techniques.

Although there has been described a preferred embodiment of this novel invention, many variations and modifications will now be apparent to those skilled in the art. Therefore, this invention is to be limited, not by the specific disclosure herein, but only by the appending claims.

We claim:

1. A gas filled bus section comprising:
an elongated tubular conductor;
an elongated tubular conductive enclosure coaxially aligned with and surrounding said conductor;
a pair of insulating spacers being positioned near the ends of said section and each having a central opening receiving and positioning said conductor and an outer periphery generally conforming to the interior contour of said enclosure;
a metallic ring provided in the inner periphery of at least one of said spacers, the inner diameter of said ring being selected to enable the ring and its associated spacer to slide freely over said elongated tubular conductor;
first means coupled to said metallic ring and said conductor for mechanically securing said metallic ring to said conductor and electrically coupling said metallic ring to said conductor;
second and third means respectively securing said spacers to said enclosure;
said second and third means each being comprised of a first metallic sleeve telescoped onto and rigidly joined to one end of said enclosure;
said first sleeve having a shoulder bearing against the outer periphery of an associated spacer;
a second metallic sleeve telescoped within and rigidly joined to said first sleeve, the end of said second sleeve projecting into said first sleeve adapted to bear against the outer periphery of an associated spacer; and
plural sealing means each positioned between the interior periphery of a spacer central opening and the surface of the conductor confronting the central opening for preventing the escape of gas from said assembly.

2. The assembly of claim 1 further comprising first and second gaskets each being positioned between the shoulder of one of said first sleeves and the confronting peripheral edge of a spacer for sealing said section against the escape of gas.

3. The assembly of claim 1 wherein said plural sealing means are annular-shaped gaskets; said conductor being provided with annular-shaped grooves arranged at spaced intervals along the conductor receiving and positioning an associated one of said gaskets.

4. The assembly of claim 1 wherein said section is filled with sulfur hexafluoride.

5. A gas filled bus section comprising:
an elongated tubular conductor;
an elongated tubular conductive enclosure coaxially aligned with and surrounding said conductor;
a pair of insulating spacers being positioned near the ends of said section and each having a central opening receiving and positioning said conductor and an outer periphery generally conforming to the interior contour of said enclosure;
a metallic ring provided in the inner periphery of at least one of said spacers, the inner diameter of said ring being selected to enable the ring and its associated spacer to slide freely over said elongated tubular conductor;
first means mechanically and electrically securing said metallic ring to said conductor;
a pair of second means, each mechanically securing an associated one of said spacers to said enclosure;
said second means each being comprised of means joined to one end of said enclosures and receiving the outer periphery of an associated spacer for airtightly sealing each end of said enclosure.

6. A gas filled bus section comprising:
an elongated tubular conductor;
an elongated tubular conductive enclosure coaxially aligned with and surrounding said conductor;
a pair of insulating spacers being positioned near the ends of said section and each having a central opening receiving and positioning said conductor and an outer periphery generally conforming to the interior contour of said enclosure;
first means for mechanically securing one of said spacers to said conductor;
second and third means respectively mechanically securing said spacers to said enclosure;
said second and third means each being comprised of a first metallic sleeve telescoped onto and rigidly joined to one of said enclosures;
said first sleeve having a shoulder bearing against the outer periphery of an associated spacer;

a second metallic sleeve telescoped within and rigidly joined to said first sleeve, the end of said second sleeve projecting into said first sleeve adapted to bear against the outer periphery of an associated spacer;

plural sealing means each positioned between the interior periphery of a spacer central opening and the surface of the conductor confronting the central opening for preventing the escape of gas from said assembly;

the ends of said conductor each extending outwardly beyond their associated spacers;

said conductor being sealed at its ends;

at least one threaded opening being provided near one of the ends of said conductor and at least one opening being provided in said conductor surface intermediate said spacers for allowing the passage of gas introduced into said threaded opening so as to fill the hollow space between the confronting surfaces of said conductor and said enclosure; and removable fastening means threadedly engaging said threaded opening to seal the gas within said section.

7. First and second bus sections, each section comprising:
an elongated tubular conductor;
an elongated tubular conductive enclosure coaxially aligned with and surrounding said conductor;
a pair of insulating spacers being positioned near the ends of said section and each having a central opening receiving and positioning said conductor and an outer periphery generally conforming to the interior contour of said enclosure;
first means mechanically securing one of said spacers to said conductor;
second and third means respectively mechanically securing said spacers to said enclosure;
said second and third means each being comprised of a first metallic sleeve telescoped onto and rigidly joined to one of said enclosures;
said first sleeve having a shoulder bearing against the outer periphery of an associated spacer;
a second metallic sleeve telescoped within and rigidly joined to said first sleeve, the end of said second sleeve projecting into said first sleeve adapted to bear against the outer periphery of an associated spacer;
plural sealing means each positioned between the interior periphery of a spacer central opening and the surface of the conductor confronting the central opening for preventing the escape of gas from said assembly;
said first and second sections being arranged in end-to-end fashion;
a hollow metallic slidable duct cover telescoped over the confronting first sleeves of the sections being joined;
means respectively securing the ends of said cover to the associated first sleeves; and
said cover having a yieldable center section to allow for differential expansion and contraction which may occur between the joined sections.

8. The assembly of claim 7 wherein said cover is comprised of first and second elongated tubular portion; said yieldable center section being comprised of a hollow metallic toroidal-shaped shell joined to the confronting edges of said first and second tubular portions.

9. The assembly of claim 7 further comprising at least one elongated conductive member having its ends connected to the confronting ends of the conductors provided in the bus sections being joined.

10. The assembly of claim 9 further comprising an elongated hollow tubular metallic corona shield telescoped over confronting end portions of the conductors joined to said conductive member and surrounding said conductive member; means securing one end of said shield to one of said conductors.

11. The assembly of claim 7 further comprising a pair of elongated conductive members having their ends connected to the confronting ends of the conductors provided in the bus sections being joined.

12. The assembly of claim 7 wherein each of said first sleeves is provided with an annular groove along its exterior surface; annular-shaped gaskets each being positioned within the grooves of each of said first sleeves and adapted to bear against the interior surface of said duct cover to prevent contaminants from entering into the assembly interior during the time that said cover is joined to said first sleeve.

13. First and second bus sections, each of said bus sections comprising:
an elongated tubular conductor;
an elongated tubular conductive enclosure coaxially aligned with and surrounding said conductor;
a pair of insulating spacers being positioned near the ends of said section and each having a central opening receiving and positioning said conductor and an outer periphery generally conforming to the interior contour of said enclosure;
first means mechanically securing one of said spacers to said conductor;
a pair of second means, each mechanically securing an associated one of said spacers to said enclosure;
said second means each being comprised of means joined to one end of said enclosure and receiving the outer periphery of an associated spacer for airtightly sealing each end of said enclosure;
said bus sections being arranged in end-to-end fashion;
a hollow metallic slidable duct cover telescoped over the confronting ones of the second means of the sections being joined;
means respectively securing the ends of said cover to the associated second means; and
said cover having a yieldable center section to allow for differential expansion and contraction which may occur between the joined sections.

14. The assembly of claim 13 wherein said cover is comprised of first and second elongated tubular portions; said yieldable center section being comprised of a hollow metallic toroidal-shaped shell joined to the confronting edges of said first and second tubular portions.

15. The assembly of claim 13 further comprising at least one elongated conductive member having its ends connected to the confronting ends of the conductors each provided in the first and second bus sections being joined.

16. The assembly of claim 15 further comprising an elongated hollow tubular metallic corona shield telescoped over confronting end portions of the conductors joined to said conductive member and surrounding said conductive member; means securing one end of said shield to one of said conductors.

17. The assembly of claim 13 further comprising a pair of elongated conductive members having their ends connected to the confronting ends of the conductors provided in the bus sections being joined.

18. The assembly of claim 13 wherein each of said second means is provided with an annular groove along its exterior surface; annular-shaped gaskets each being positioned within the grooves of each of said second means and bearing against the interior surface of said duct cover to prevent contaminants from entering into the assembly interior during the time that said cover is joined to said second means.